(12) United States Patent
Ouimet

(10) Patent No.: US 6,599,054 B2
(45) Date of Patent: Jul. 29, 2003

(54) CONNECTING DEVICE FOR THE CABLES AROUND A LOG

(76) Inventor: Peter Ouimet, 9423 192nd St, Surrey B.C. (CA), V4N 3R7

( * ) Notice: Subject to any disclaimer, the term of this patent is extended or adjusted under 35 U.S.C. 154(b) by 0 days.

(21) Appl. No.: 09/910,290

(22) Filed: Jul. 19, 2001

(65) Prior Publication Data

US 2002/0098037 A1 Jul. 25, 2002

Related U.S. Application Data

(63) Continuation of application No. 09/430,193, filed on Oct. 29, 1999, now abandoned.
(60) Provisional application No. 60/124,777, filed on Mar. 17, 1999, and provisional application No. 60/143,035, filed on Jul. 7, 1999.

(51) Int. Cl.⁷ .................................................. F16B 2/14
(52) U.S. Cl. .................................... 403/374.1; 403/368
(58) Field of Search ................................ 403/256, 365, 403/367, 368, 369, 374.1, 379.4, 390

(56) References Cited

U.S. PATENT DOCUMENTS

| | | |
|---|---|---|
| 239,834 A | 4/1881 | Paldi |
| 356,691 A | 1/1887 | Loch |
| 430,176 A | 6/1890 | Cross et al. |
| 459,513 A | 9/1891 | Montz |
| 904,863 A | 11/1908 | Vint |
| 1,139,595 A | 5/1915 | Starr |
| 1,165,785 A | 12/1915 | Knoche |
| 1,269,507 A | 6/1918 | Proctor |
| 1,692,993 A | 11/1928 | Lambert |
| 1,708,979 A | 4/1929 | Usher |
| 2,025,556 A | 12/1935 | Stahl |
| 2,220,203 A | 11/1940 | Branin |
| 2,417,658 A | 3/1947 | Nichols |
| 2,458,304 A | 1/1949 | Runde |
| 2,470,326 A | 5/1949 | Tallman et al. |
| 2,835,949 A | 5/1958 | Wengen et al. |
| 2,897,563 A | 8/1959 | Jonovich |
| 2,917,799 A | 12/1959 | Meighan |
| 2,961,671 A | 11/1960 | Meighan |
| 4,040,754 A | 8/1977 | Burroughs |
| 5,147,145 A | 9/1992 | Facey et al. |
| 6,074,124 A | 6/2000 | Scarr |

FOREIGN PATENT DOCUMENTS

| | | |
|---|---|---|
| CA | 1131890 | 9/1982 |
| CA | 2035463 | 12/1990 |
| CA | 2116030 | 3/1993 |
| CA | 2250149 | 10/1997 |
| GB | 270106 | 5/1927 |

OTHER PUBLICATIONS

Vanguard Steel Ltd. Price list.
Gripple Rope Grip label.

*Primary Examiner*—Lynne H. Browne
*Assistant Examiner*—David E. Bochna
(74) *Attorney, Agent, or Firm*—Robert B. Hughes; Hughes Law Firm, PLLC

(57) ABSTRACT

A locking device assembly to connect two sections of cable together. The locking device assembly has a body with two chambers with two wedge members that each have base portions that are each positioned on substantially opposite sides of the body in the chambers. Each wedge member and chamber can hold a cable therein and each cable can have tension place upon it without slippage. The cables can be easily removed by hitting the front end portions of the wedge members.

29 Claims, 11 Drawing Sheets

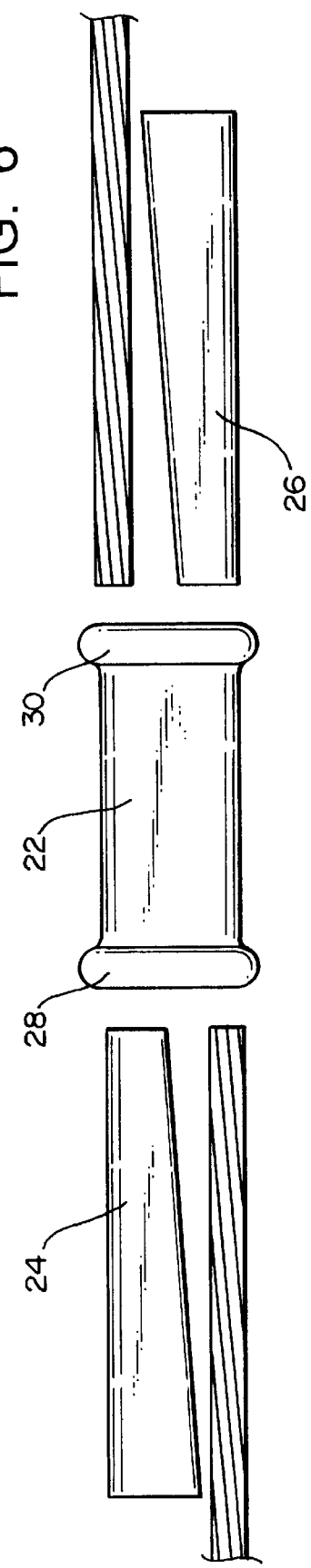

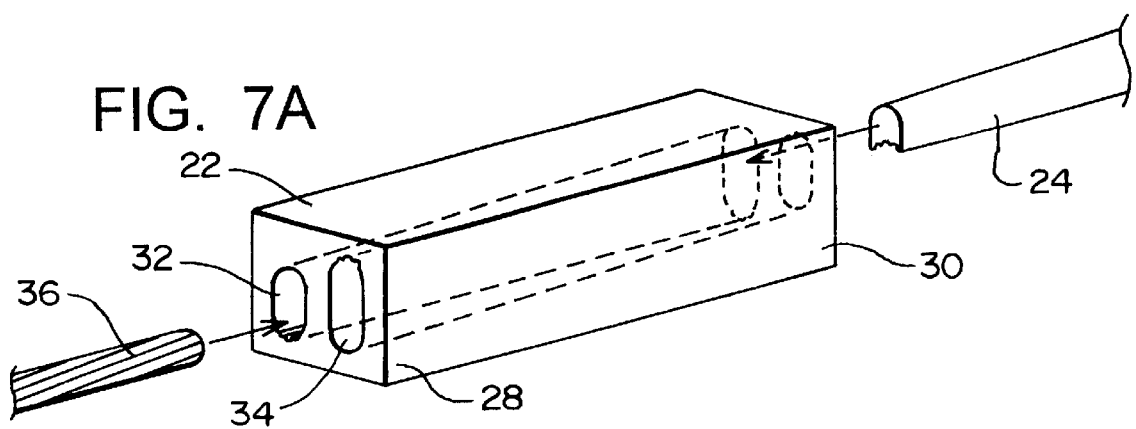
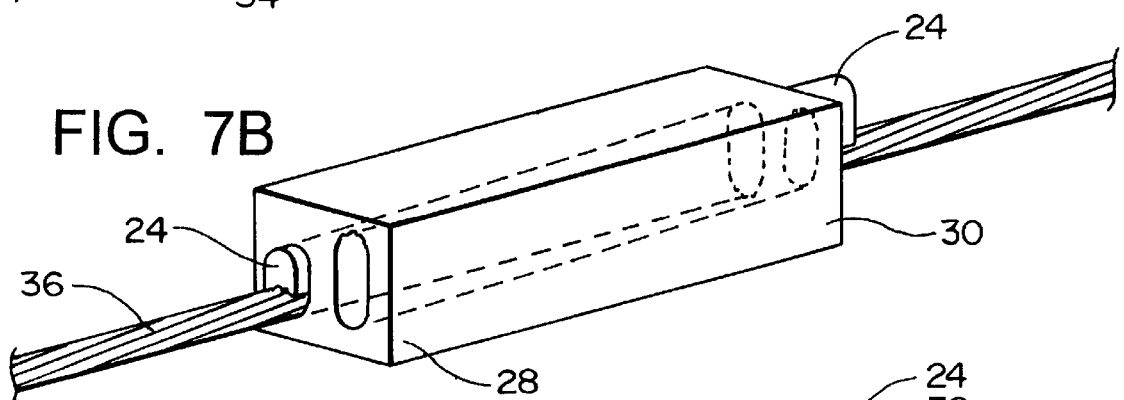
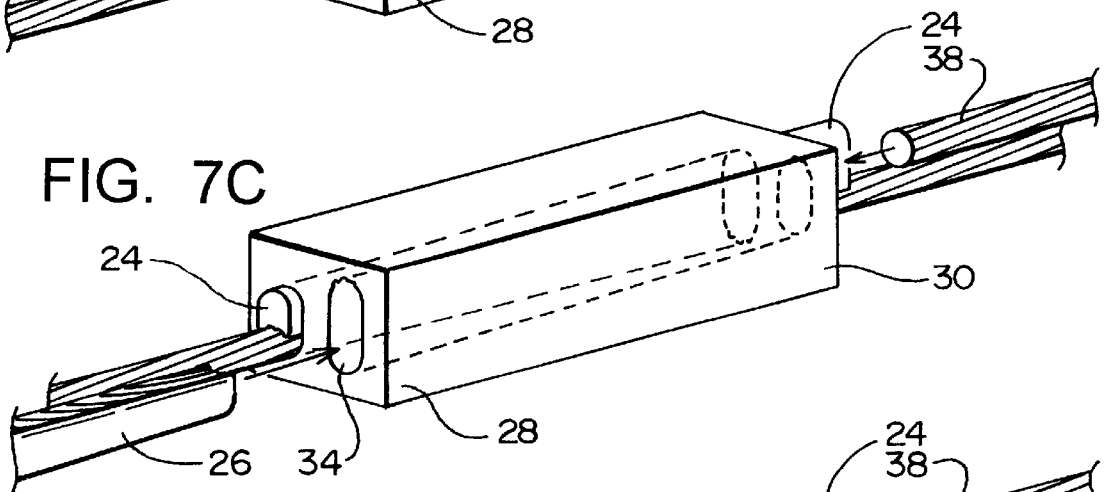
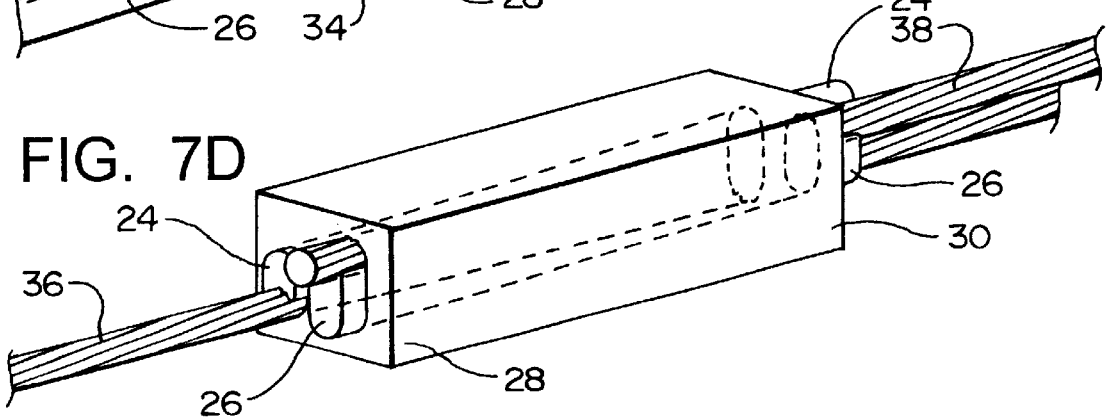

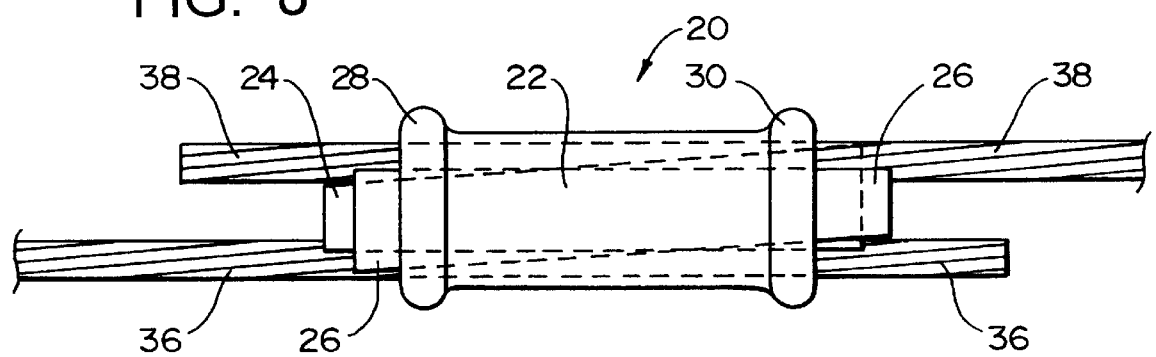
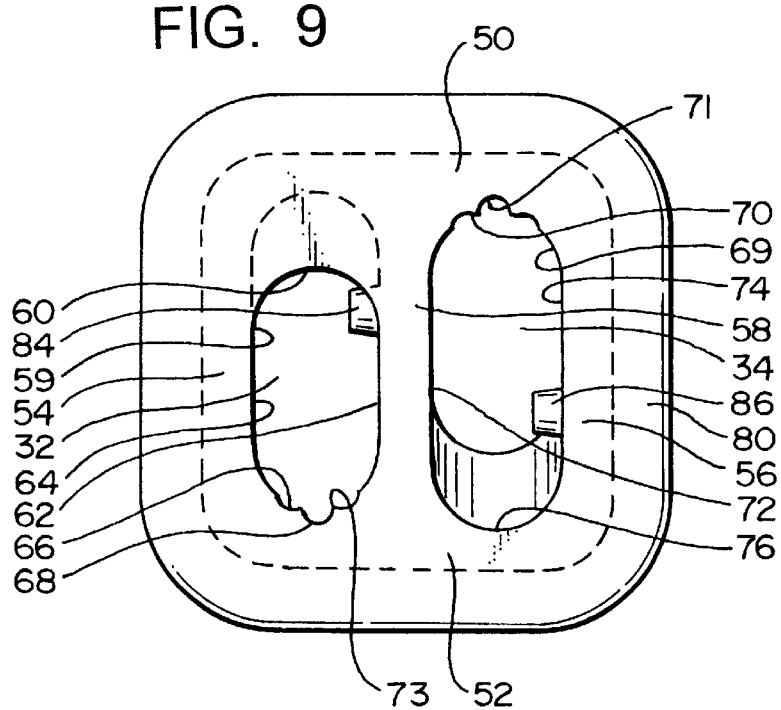

CONNECTING DEVICE FOR THE CABLES AROUND A LOG

RELATED APPLICATIONS

This application is a Continuation of U.S. patent application Ser. No. 09/430,193 filed Oct. 29, 1999 now abandoned and claims priority of U.S. Provisional Ser. No. 60/124,777 filed Mar. 17, 1999 and No. 60/143,035 filed Jul. 7, 1999.

FIELD OF THE INVENTION

The invention relates to devices and methods of connecting cables together. More specifically, the invention relates to a hook that can lock two cables together where tension forces are imposed on cables to pull the cable ends in the opposite directions. The device is particularly advantageous for bundling logs together.

BACKGROUND

Log bundling devices have been used in the logging industry where a pair of cables are placed around a group of logs. In a log transferring operation a bundle of logs is held in two U-shaped frames where the bottom portion of the log bundle spaced above the floor or ground level. Two lengths of cable each with a locking device are used to connect the ends of cables in order to secure the logs in a log bundle.

The procedure of bundling the logs together generally consists of throwing a cable around the top of one end portion of a log bundle in the U-shaped frames. One end of cable is then pulled under the log bundle to extend circumferentially around, and the two ends of the each cable length are fastened together with a locking device. One such locking device is a circular tube where both ends of the cable are extended into and through opposite ends of the tube and a clamping apparatus clamps the tube tightly which deforms the tube to press against the cables. Once the tube is fastened to the cable ends, the loop of cable now secures the logs in a bundle. The same process is done on the other end portion of the log bundle. Generally two cable section loops will secure a log bundle sufficiently, although more loops can be used. When the log bundle is secured it is commonly ejected from the two fork frames into an adjacent body of water and the log bundle floats or is tugged through the body of water to a log separation and transport area.

At the separation and transport area, the bundle is lifted from the water and each cable is then broken by a crane-like machine that has a long arm and at the end of the arm there are two a gripping members which grip the cable on opposite sides of the cable. The gripping members are rotated thereby increasing the tension to beyond the cable's load capacity which snaps the cable. The machine then lifts the broken wire loop with the locking device still attached thereto and moves it over to in a recycling pile. The locking device which is generally a tube is usually made of a different metal than the cable and it must be separated from the cable for recycling purposes. Because the tube is crimped on the cable it is difficult and costly to remove.

SUMMARY OF THE INVENTION

The invention is an improved method of locking cables and a reusable locking device, herein referred to as the "hook" The invention is particularly advantageous for bundling logs by connecting end portions of a cable together in a loop to hold a log bundle together. The present invention allows quick removal of the fastening device (the hook) that is still attached to the cable and the hook can be reused and the cable can be recycled separately from the hook.

In the preferred form, the invention comprises a body with two longitudinal chambers therein. The chambers are adapted to hold two wedge members where each wedge member has a front-end portion and a base end portion. Each wedge is adapted with a longitudinal slot positioned on the side wall of the wedge. Each chamber has an extension that extends into the slot area of each wedge to prevent the wedge member from being completely removed and separated from each chamber.

Each chamber is adapted to receive a cable and the chamber's corresponding wedge member holds the cable therein. A surface portion within each chamber defines longitudinal grooves, which are designed to engage a cable and prevent the cable from rotating and slipping out of the chamber. The corresponding wedge for each chamber has a top surface, which defines oblique grooves that engage the cable located in the chamber and help hold the cable fixed therein.

As the wedge members slide into a chamber the distance between the oblique grooved surface of the wedge and the longitudinal grooved surface of the chamber is decreased. As the base end portion of the wedge is forced into a chamber of the body, the frictional force between the oblique grooved surface of the wedge and the upper longitudinal grooves defined by the chamber's upper surface fix the cable therein. When tension is applied to the cable from the front-end portion of the wedge (the working end), the cable will remain fixed in the chamber. To remove the cable, a force is exerted on the front-end portion of the wedge (e.g. it is hit with a hammer) which dislodges the wedge from the cable. When the cable is removed the hook can be reused.

It is an object of the invention to provide a compact fastening device that is easy to attach to two ends of a cable and is reusable.

It is further an object of the present invention to provide a locking device that will endure substantial tension of the cables wedged therein yet have the ability to remove the cable by easily dislodging the wedge.

BACKGROUND ART

Other locking devices have been employed that link two pieces of wire. U.S. Pat. No. 5,147,145 (Facey et al) shows a wire joining means in which spring loaded ball acts as the wedging means to hold wires. The patent discloses that the invention is particularly used for connecting together links of wire fence. As seen in FIG. 4, the abutments 32A position the spring 26A which biases balls 25 to the position toward the passage means 21. In operation, two wires each enter ends 30a and 30b of the bore 21 and biases the balls 25 back down the channels 23A and 23B. As seen in FIGS. 5 and 6, when each wire is placed in tension the frictional force of the balls 25 hold the wire in place.

FIGS. 13 and 14 show another embodiment were the ball 25 travels through the channel 21 and are biased by spring bows 26A and 26B. This embodiment gives the user access to the lateral tabs 43 where a manual grip can release the balls from engaging the wire so that the connector can be reused.

U.S. Pat. No. 1,165,785 (Knoche) discloses a joining means where ropes are held in place by spring loaded wedges. The wedge members 7 apparently pivot about point 10 and are biased by a spring 11 to pull the wedge members clockwise. The curved bearing surface 8 then engages the rope 1 creating a frictional force.

U.S. Pat. No. 1,139,595 (Starr), shows a clutch clamp where springs L bias rollers G into the cables A. With reference to FIG. 1, if the lower left cable A is pulled down and the upper right cable A is pulled up, the clutch clamp should hold the cables in place.

The next group of patents disclose mechanisms that function on a wedging principal without internal biasing springs other than the inherent spring-like characteristics of the wedges. These patents include the following:

U.S. Pat. Nos. 2,961,671 and 2,917,799 (Meighan) show a means for holding a group of logs in a bundle in which the ropes are held by a wedge like device.

A parallel fitting member is shown in FIGS. 2 through 6. An elongated body member 10 is pivotally attached to a clamping member 16 so that the clamping member 16 folds over upon two sets of cables that are to be wedged together. The clamping member 16 is then held in place by a second keeper 20 where the pin 20 goes under the ears 11 and 12 of the elongated body member 10 and over hook 18 of clamping member 16. Then keepers 20 and 19 are pounded in between the ears 14 and 15 so the thicker portion of the keeper 20 bias the ears 11 and 12 up and the hook 18 away from each other thus clamping the cables.

U.S. Pat. No. 904,863 (Glass) shows a two piece wire clamp that comprises a grip 1 connected to a locking member 9. With reference to FIG. 1, a wire 15 is positioned between a grooved portion 13 of locking member 9 and fixed jaw 4 of the grip 1. As the head 10 is pounded with a hammer the frictional force between jaws 4 and 5 hold the cable and locking member 9 in place. The primary purpose of this device is to grip wire to stretch it for installation.

U.S. Pat. No. 459,513 (Montz) shows a locking device similar to the previously mentioned U.S. Pat. No. 904,863. As best seen in FIG. 13, the key F engages the rope that is biased by keeper B which forces the teeth of the key F into the rope. The invention is primarily used for fastening picture frames where the base-plate A is fastened to a picture frame.

U.S. Pat. No. 356,691 (Loch) shows a two-piece line faster that comprises the rope supports A and a jaw C. In operation, the rope is first placed under the bar E, and then the jaw C is fitted to the rope B. The rope B is pulled tight, and the bar E biases the jaw C into the rope and thus frictionally holding it in place.

U.S. Pat. No. 239,834 (Paldi) shows a rope fasting means which comprises three parts; a flattened tube A, and two metal wedges B. FIGS. 1 and 2 show the two methods of operation for the invention. The left rope portion is pulled up and the right rope portion is pulled down so the wedges B are biased towards each other creating a frictional effect.

U.S. Pat. No. 2,417,658 Nichols discloses a log bundling operation a locking device is employed that utilizes a screw to fasten the cable between two clamps.

The prior art lacks any disclosure of a locking device that fastens two cables together where one end of a cable can be locked independently of the other end of cable to be locked.

BRIEF DESCRIPTION OF THE DRAWINGS

FIG. 6 shows an exploded view of the locking device and two cable sections;

FIGS. 7a–7d are oblique views of a the locking device that show progressively through the figures how two cable sections are locked together in a somewhat schematic manor;

FIG. 8 is a front view of 7d where two cable sections are locked therein the chambers;

FIG. 9 is a side view of the body of the locking device;

DETAILED DESCRIPTION OF THE PREFERRED EMBODIMENT

Throughout this description reference is made to top and bottom, front and rear. The device of the present invention can, and will in practice, be in numerous positions and orientations. These orientation terms, such as top and bottom, are obviously used for aiding the description and are not meant to limit the invention to any specific orientation.

In the following text, there will first be a description (with reference to FIGS. 1–5) of how bundles of logs are commonly secured with a pair of cable sections and two locking devices in a logging operation. Then there will be a brief description of the main components of the locking device of the present invention and how the two ends of a cable length are secured together using this locking device (this being done with reference to FIG. 7). After that, there will be a more detailed description of the components of the present invention and various feature thereof.

Figure 1:
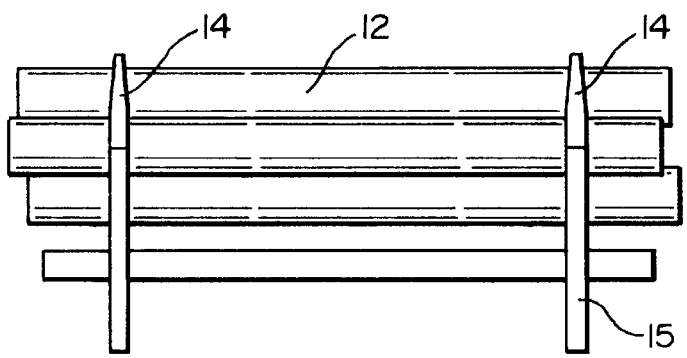
FIG. 1 shows a front view of a bundle of logs in a support frame.
Figure 2:
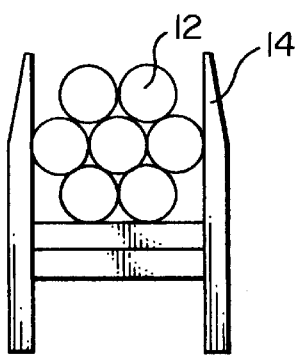
FIG. 2 is a side view of the bundle of logs as shown in FIG. 1.
Figure 3:
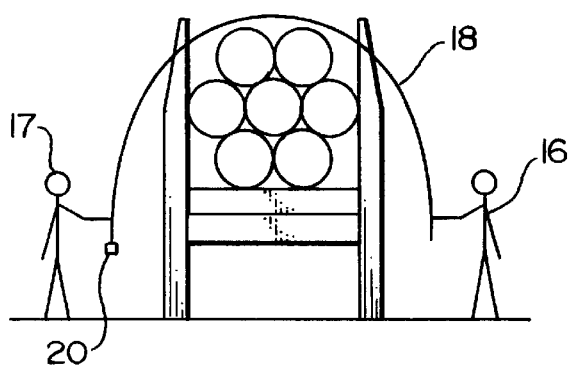
FIG. 3 is a side view of a bundle of logs where two individuals are binding the logs with a cable and locking device.
Figure 4:
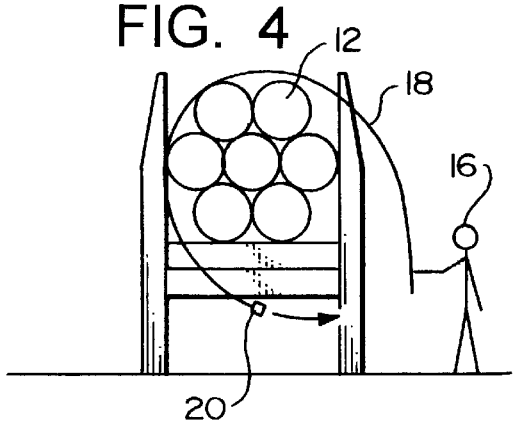
FIG. 4 shows the next step from FIG. 3 where the locking device and cable are passed under the bundle of logs
Figure 5:
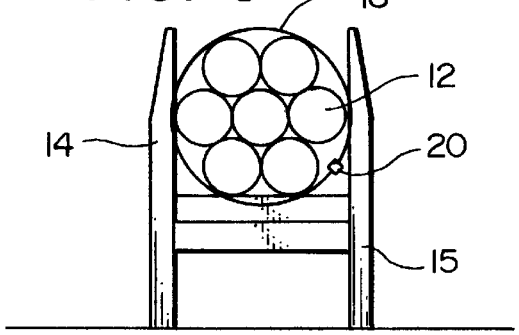
FIG. 5 shows the log bundle with a cable and locking device securing the bundle together.

The environment where the present invention is desirably used is in a log bundling operation where two lengths or pieces of cables and two locking devices are employed to hold the bundle of logs together. As seen in FIG. 1, the logs 12 rest in the two U-shaped frames 14 of a containing structure 15. There are two workers 16 and 17 on opposite sides of the logs 12. To secure the log bundle, the first worker 16 throws a cable 18 with a locking device 20 attached thereto, over the log bundle as shown in FIG. 3. The second worker 17 retrieves the cable 18 and the locking device 20 (hereinafter called the "hook" or "connector assembly") and passes it under the log bundle 12 back to the first worker 16 who can then secure the log bundle together.

It can be seen that the hook 20 comprises a body 22, a first wedge 24 and a second wedge 26. The body 22 has a forward end 28 and a rear end 30, and also has first and second chambers 32 and 34 which are open at both the front and rear ends 28 and 30 of the body and extend the length of the body 22.

Also shown in FIG. 8 are two end portions of a cable length 36 and 38, such as shown as 18 in FIGS. 1–5, which are locked together by the locking device 20. The first end cable portion 36 is shown in FIGS. 7a and 7b, and the second cable end portion 38 is shown in FIGS. 7c and 7d.

At this time, it should be noted that the drawing of FIG. 7 are somewhat schematic, in that the two wedges 24 and 26 are shown removed from the body 22. In the preferred embodiment shown herein, each of the wedges 24 and 26 are permanently positioned in their respective chambers 32 and 34 by a finger and slot connection which will be described later herein. However, for purposes of this initial simplified explanation, these two wedges 24 and 26 are shown separated from the body 22.

Figure 10:
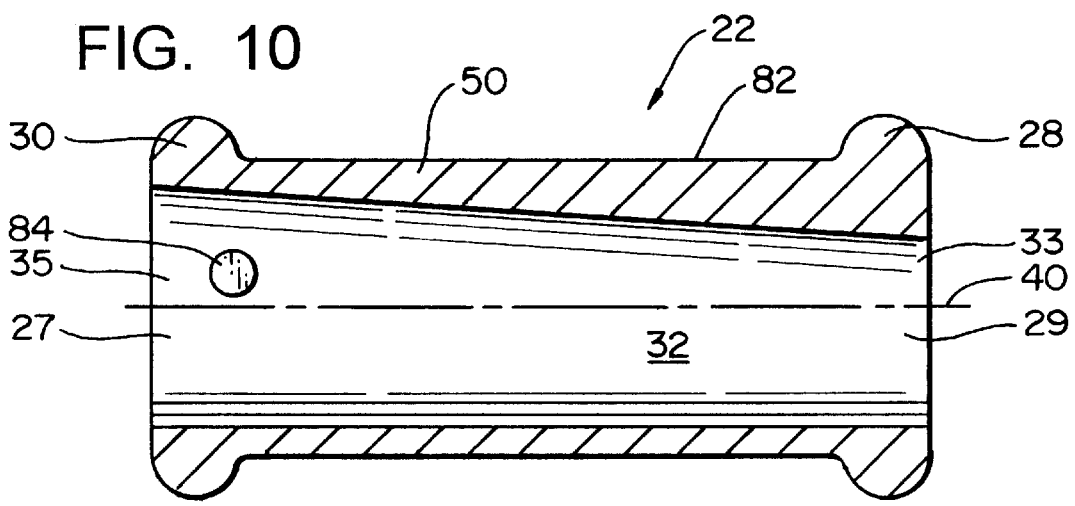
FIG. 10 is a cross sectional view of the locking device taken at line 10 of FIG. 11.
Figure 11:
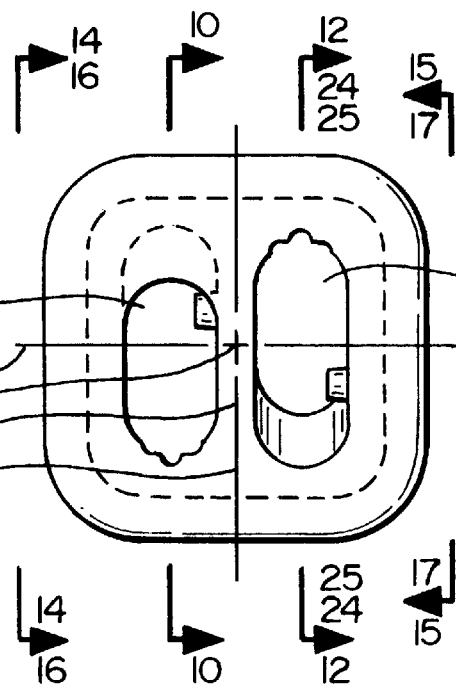
FIG. 11 is a side view of the locking device of FIG. 6.

Further, for purposes of description, the body 22 shall be considered as having a longitudinal center axis 40, a horizontal transverse axis 42 and a vertical axis 44 (see FIGS. 10 and 11). Further, the longitudinal axis 40 and the vertical axis 44 shall be considered as occupying a vertical reference plane, indicated at 46 in FIG. 10.

At this point in the text, there will now be given a brief summary of the operation of the locking device 20 of the present invention shown schematically in FIGS. 7a–7d. With reference to FIG. 7a, there is the first cable end portion 36 which is moved to the right into and through the chamber 32 to the position of FIG. 7b. (As indicated earlier herein, while the wedge 24 is shown outside of the chamber 32, it was actually positioned within the rear part of the chamber 32) and positioned further to the right of that shown in FIG. 7 (so that it leaves a greater gap for insertion of the cable 36).

After the cable 36 has been extended through the lower part of the chamber 32, then the first wedge 24 is moved to the left as seen in FIG. 7b so that it wedges against the cable 36 and upper surface 60. At that point, to ensure that there is secure wedging engagement, a hammer may be impacted on the right end surface of the wedge 24 to make sure that it is securely holding the cable end portion 36.

At this point, the locking device 20 is properly secured to the cable end portion 36, and the end portion 36 of the cable 18 can be thrown over the top of the log bundle 12, as illustrated in FIG. 3. (Again, it is to be noted that throughout this operation the two wedges 24 and 26 are securely positioned within the body 22 while allowing a certain amount of longitudinal motion due to the finger and slot locating device which will be described later herein).

When the device 22 has been thrown to the other side of the log bundle 12 as shown in FIG. 3 and the cable end 36 with the locking device 20 attached thereto is passed underneath the log bundle 24, by the second worker 17, then there is the task of the worker 16 to connect the second cable end portion 38 to the locking device 22. This is accomplished in substantially the same manner as the first cable end portion 36. More specifically, as shown in FIG. 7c the cable end portion 36 is inserted through the chamber 34, and the wedge 26 (which all during this time has remained positioned within the body 22 but not in a position of locking engagement) is then moved to the right (as seen in FIG. 7d) so that it also comes into wedging engagement to hold the cable end portion 38 in place. Then the left hand surface (as seen in FIG. 7d) of the wedge 26 can be struck with a hammer or other object to drive the wedge 26 into proper securing engagement. FIG. 8 shows a front view of the two cable ends 36 and 38 secured together in the hook 20.

As indicated earlier herein, in the logging operation in which the locking device 20 of the present would be used, after the log bundle 12 has been properly secured by two cable links being looped around the log bundle 12 with their end portions 36 and 38 locked together by a locking device 20, then the log bundle is commonly dropped into a body of water (or otherwise moved to a shipping location) and carried to another location where the cables 18 are loosened and the logs are processed in some other manner such as being sawed, made into wood chips, etc.

In the present invention, to loosen the two cable end portions 36 from one another, the wedges 24 and 26 are impacted at their small end or by a hammer or other object to drive them out of their locking position. When this is accomplished, the two cable end portion 36 and 38 can easily be removed from the body 22. Again, as indicated previously, when this is done the two wedges 24 and 26 remain in the body 22.

The two cables 18 can then be moved to another location for recycling. The two locking devices 22 can be gathered at another location and taken back to the bundling location where these are used as another set of cable links to secure another bundle of logs as described above.

MORE DETAILED DESCRIPTION OF THE DEVICE OF THE PRESENT INVENTION

Reference is now made to FIGS. 9–17 to describe in more detail the configuration of the body 22 and also of the two chambers 32 and 34. As indicated previously, the body 22 comprises a front-end portion 28 and rear end portion 30. This body comprises a top wall 50, a bottom wall 52, two side walls 54 and 56, and a vertically oriented center wall 58 that is coincident with and aligned with the aforementioned longitudinal-vertical plane 46. With reference to FIG. 9, the chamber 32 is located between the side wall 54 and the center wall 58, and also by adjacent portions of the upper and lower walls 50 and 52. The chamber 32 is defined by a first inner surface 59 having upper surface 60 (or first surface), an inside surface 62 at the center wall 58 and an outer inwardly facing surface 64 at the side wall 54, and a bottom surface (second surface or first cable engaging surface) 66 at the lower wall 52. The lower surface 66 is longitudinally aligned and extends parallel to the longitudinal center axis 40. The upper surface 66 slants relative to the longitudinal center axis 40 in an upward direction from the front end 28 to the rear end 30 at a moderate slant. In a transverse section, the upper surface 60 is curved in a semi-circle to match the contour of the adjacent surface of its wedge 24.

The lower surface 66 and upper surface 70 is preferably formed with a plurality of elongate grooves 68 and 71 which will be described in more detail later herein. Briefly, it has been found that these particular longitudinally aligned grooves better enable the wedges 24 and 26 to properly engage the respective cable ends to provide a more secure locking of these cable ends.

Figure 14:
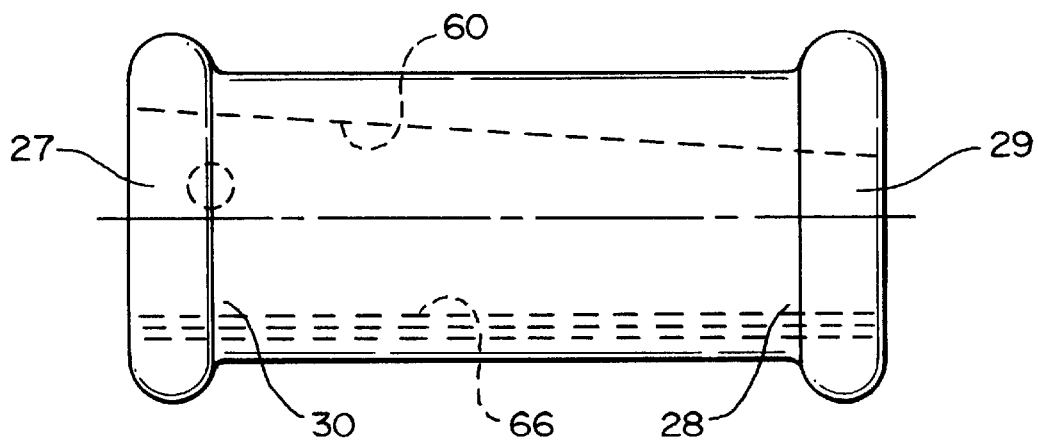
FIG. 14 is a rear view of the body of the locking device taken at line 14 FIG. 11.
Figure 16:
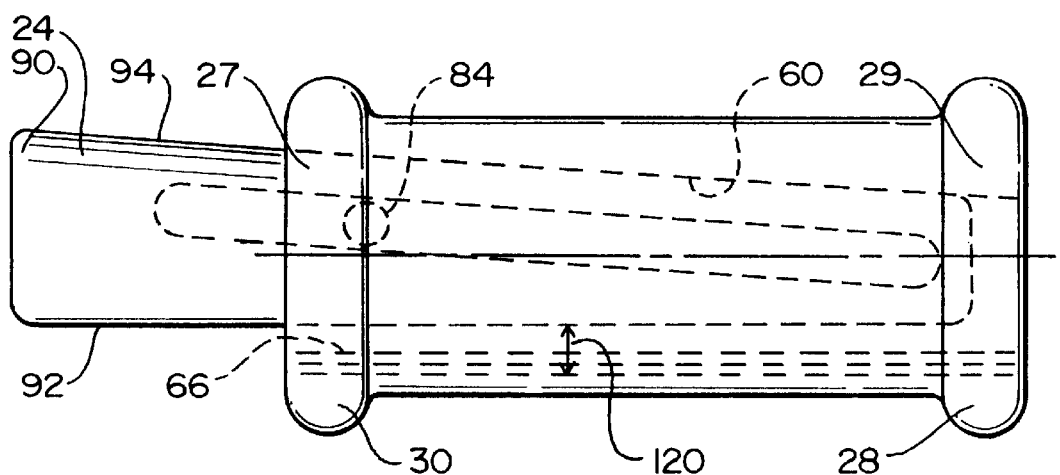
FIG. 16 is a rear view of the locking device similar to FIG. 14 except this figure shows a wedge partially inserted into the first chamber. The hidden lines of the first chamber are shown as hatched lines.

As seen in FIGS. 14 and 16 chamber 32 further has a working end 29 and a dog end 27. The working end 29 is located on the front end portion 28 for chamber 32 and is recognizable because the smaller hole 33 is located on this end and the larger hole 35 is located on the dog end 27.

The second chamber 34 is configured substantially the same as the first chamber 32, in that it has substantially the same surface configurations as the chamber 32, except that the orientation of these surfaces are modified.

Figure 12:
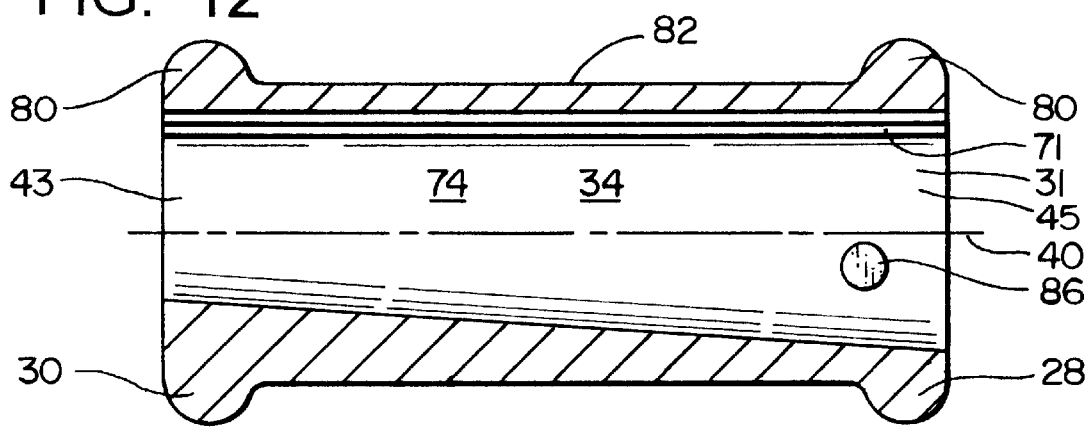
FIG. 12 is a cross sectional view of the locking device taken at the line 12 of FIG. 11.
Figure 13:
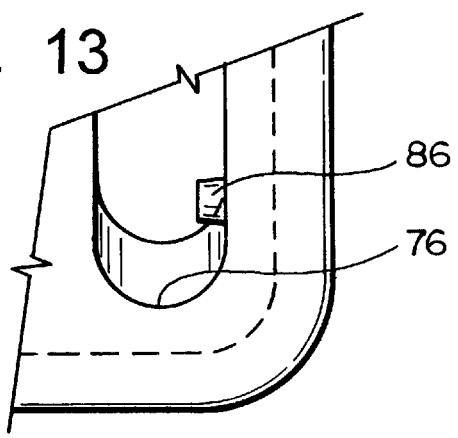
FIG. 13 is a view of the extension of one of the chambers.
Figure 15:
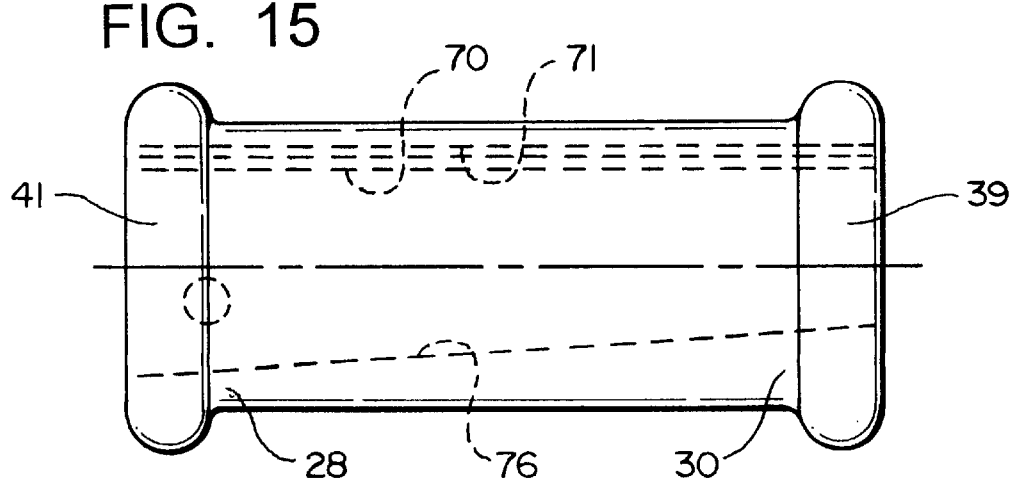
FIG. 15 is a front view of the body of the locking device taken at line 12 in FIG. 11.

With reference to FIG. 9 and also to FIGS. 12 and 15, it can be seen that the chamber 34 defined by a second inner surface 69 having an upper surface (second surface) 70, an inner side surface 72 at the central wall 58, an outer inwardly facing side surface 74 at the side wall 56, and a bottom upwardly facing surface (first surface) 76 at the lower wall 52.

The lower surface 76 has a transverse cross sectional configuration which is curved in a semicircle to match its related wedge 56, and slants in a downward direction from the rear end 30 to the front end 28 of the body 22.

The upper surface 70 is generally circumferentially curved, as is the surface 66, but has longitudinal grooves 71 formed therein in the same manner as the lower surface 66. Again, this will be explained later herein how these oblique grooves function to obtain better engagement of the cable end portions.

Also, the body 22 has formed at each end a raised perimeter end portion 80 that extends outwardly from an outer surface 82 surrounding the body 22. These raised end portions 80 provide structural reinforcing, and also enable the body portion to be more securely gripped in a person's hand, with the raised portions 80 resisting and preventing the body 22 from slipping out of the person's hand.

Also, it will be noted that with reference to FIG. 9 that the inside surface 62 of the chamber 32 has a protrusion, extension, finger or stub 84 that extends a short distance outwardly from its related inside surface 62, adjacent to the rear end of the body 22. Also, the chamber 34 has on its outer position side surface 74 a protrusion, extension, finger or stub 86. As will be described later, each of these stubs 84 or 86 cooperates with slots 104 and their related wedges 24 and 26 to retain the wedges 24 and 26 within the body 22.

Figure 17:
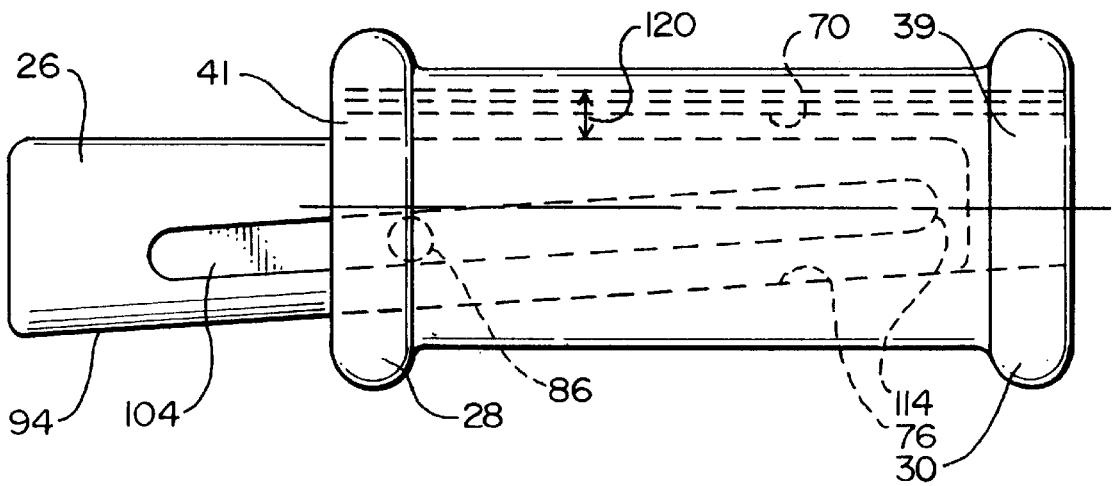
FIG. 17 is a front view of the locking device similar to FIG. 15 except a wedge member is shown partially inserted into the second chamber.

As seen in FIGS. 15 and 17, chamber 34 also has a working end 39 and a dog end 41. The working end 39 of chamber 34 is located on rear end portion of the body 22 where the smaller hole 43 is also located. On the front end portion 28 of the body 22 the dog end 41 is located along with the larger hole 45. Note that the working ends 39 and 29 of chambers 34 and 32 are on opposite sides of the body 22. The working ends 29 and 39 are the ends where tension of a cable is applied when the hook 20 is in use. Thus, as seen in FIG. 8, for the cables ends 36 and 38 to be substantially aligned the working ends 29 and 39 must be in substantially opposite ends of the body 22. The chambers could be, for example one hundred and twenty degrees from each other; however, this creates a moment about the cable thereby creating a stress concentration which may be desirable in circumstances where the cable should break when considerable tension is applied.

To describe now the two wedges 24 and 26, reference is initially made to FIGS. 18–21. The two wedges 24 and 26 are identical, so only the wedge 26 will be described, being understood that this relates also to the wedge 24.

The wedge 26 has a front end (first and second forward ends for first wedge 24 and second wedge 26) 88 and a rear base end 90. The wedge 26 has a top surface (first cable engaging surface) 92, a lower surface (first body engaging surface) 96, and two side surfaces 96 and 98, respectively. It also has a base rear end surface 100 and a front surface 102.

Figure 18:
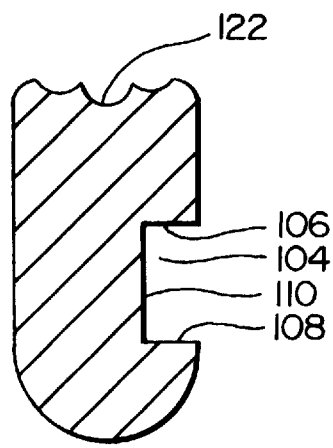
FIG. 18 is a cross sectional view of one of the wedge members taken at line 18 of FIG. 20.
Figure 19:
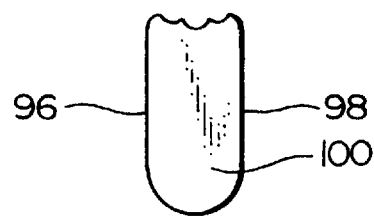
FIG. 19 is an end view of a wedge member.

The side surface 98 is formed with an elongate slot 104 having upper and lower surfaces 106 and 108, and also an inner surface 110 (see FIG. 18). The slot 104 can be initially open at the front end 88 and extends rearwardly to terminate at its rearward end 112 a short distance forward of the base rear end surface 100. Alternatively, the slot can be formed to additionally terminate at the forward termination point 114. This slot 104 has an alignment axis 116 that is parallel to the bottom surface 94. The vertical distance between the two slot surfaces 106 and 108 is moderately larger than the diameter of each of the stubs 84 and 86.

The two side surfaces 96 and 98 are substantially planar and the width of the wedge 26 is just slightly smaller than the lateral dimensions of the two chambers 32 and 34. The top surface 92 extends parallel to the longitudinal axis, and the bottom surface 94 has a moderate upward slant from the rear end 90 to the forward end 88.

During assembly of the hook 20, the front-end portion 88 of wedge 24 is inserted into the larger hole 35 of the chamber 32. The wedge 24 is orientated in a manner so the bottom surface 94 is in contact with the upper surface 60 of chamber 32 (see FIG. 16). When the wedge member 26 is partially in the chamber 32, the extension 84 is formed to enter the groove 104 so the wedge 24 is now locked into chamber 32 and can move in and substantially out of the chamber 32 but can not be separated from the body 22. This assumes that forward termination point 114 has already been formed.

A similar process is done to wedge member 26, except the extension 26 is formed on the outer surface 74 of chamber 34 (see FIG. 17). By forming the extension on the outer surface 74, wedge 26 can have the exact same geometry of as wedge 26. Hence, both wedge members can be produced from the same mold. This greatly aids production because the person doing the assembly has to only be concerned with one supply of wedge members and does not need to worry about having the correct number of two different symmetric wedge members.

Figure 20:
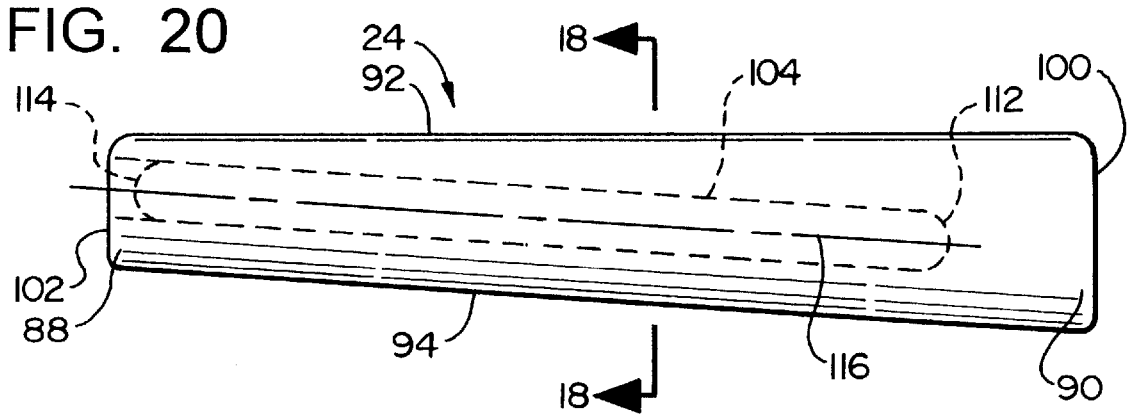
FIG. 20 is a front view of a wedge member.
Figure 21:
FIG. 21 is a top view of a wedge member showing the top surface that is formed with oblique grooves that are adapted to engage a cable.

Another way of constructing the present invention is the groove 104 can extend all the way through to the front portion 88 and the forward termination point 114 is not present of the wedge member 24 and 26 as shown in FIG. 20. The wedge member 24 is inserted in the chamber 32 at the forward end 28 and extension 84 is fitted into slot 104 and the wedge member is then extended all the way through the chamber 32 to a position shown in FIG. 7b (the cables don't need to be included). Then a forward termination point 114 can be formed at front end portion 88 of the wedge member 24. This closes off the groove 102 thereby locking the wedge member 24 into its respective chamber 32.

Analysis of the Chamber Angles and Force Distribution

Now we will analyze the chamber and wedge angles to get a better grasp of how they effect the force distribution on a cable positioned inside a chamber. The analysis will be only done on chamber 34 and wedge member 26; however, chamber 34 and wedge member 26 have the same relationships with only a different orientation. For word economy purposes, only chamber 34 and wedge member 26 will be analyzed hereinbelow with the understanding that the same force distribution is occurring in chamber 32.

Figure 22:
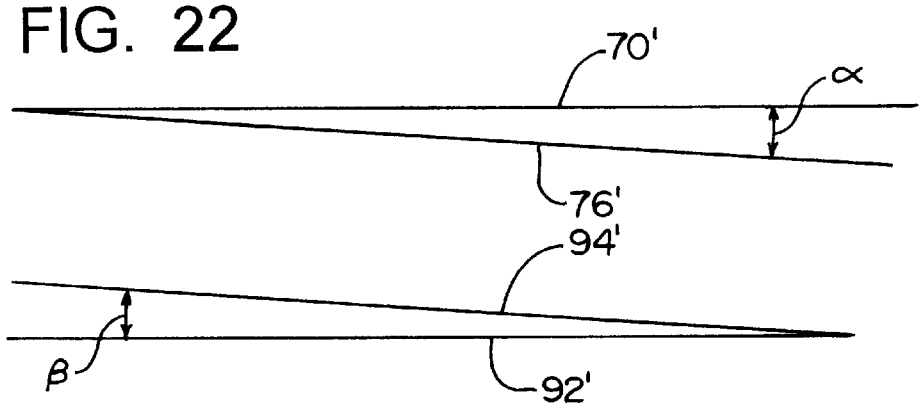
FIG. 22 is a vector diagram illustrating the angle relationships of the wedge members and the body.
Figure 23:
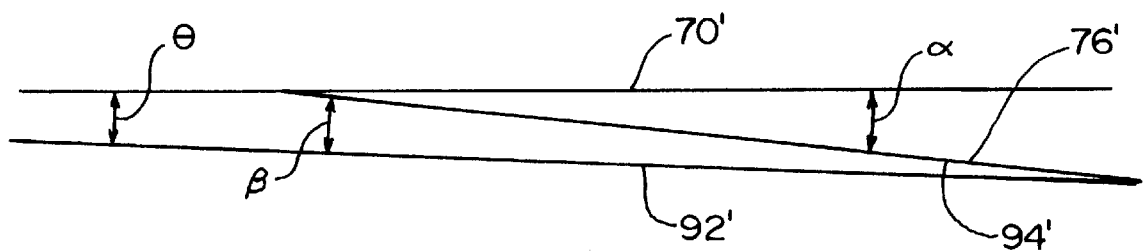
FIG. 23 is another vector diagram of FIG. 18 except vectors 72' and 94' are overlapped.
Figure 24:
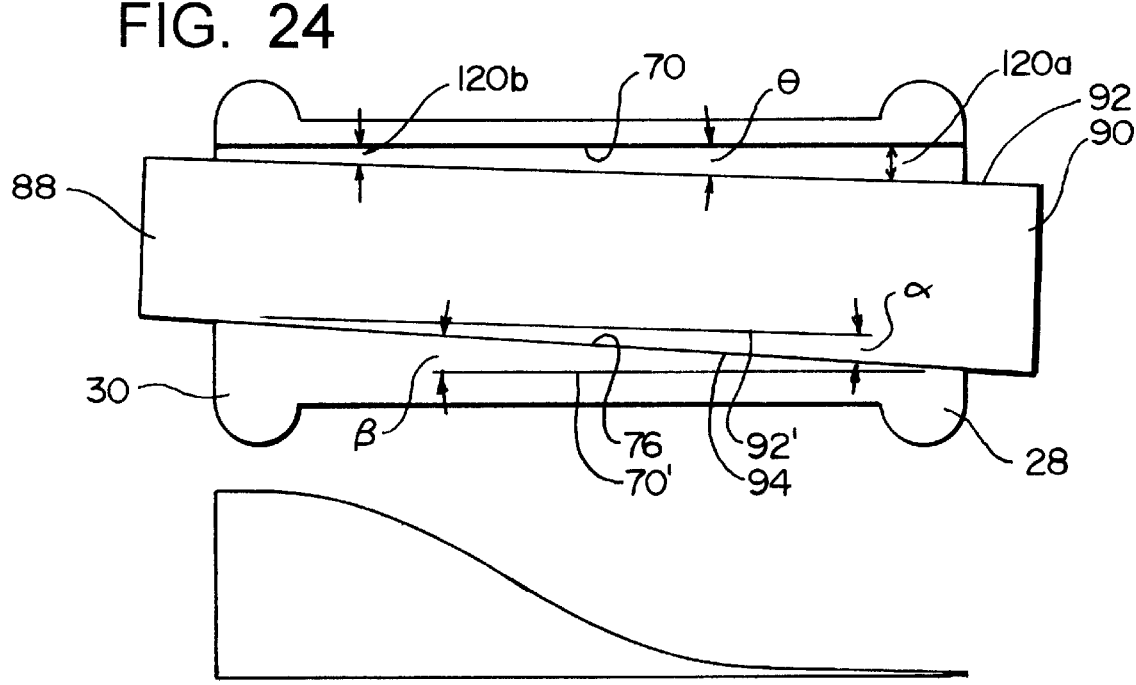
FIG. 24 is a cross sectional view of the body and a wedge member of the hook taken at line 12 of FIG. 11, along with a force distribution curve showing a front loaded pressure distribution.
Figure 25:
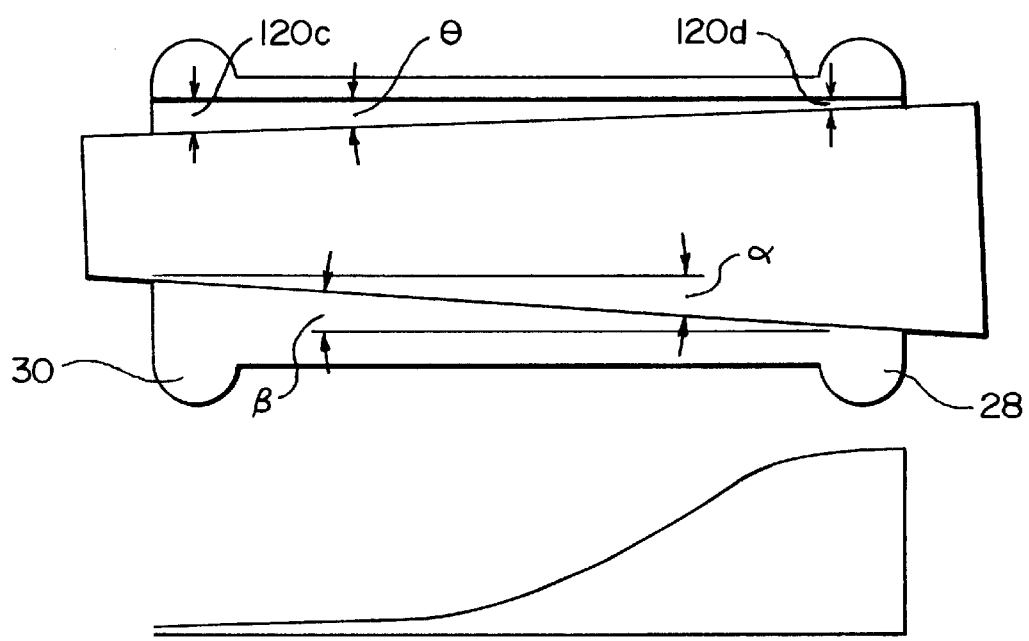
FIG. 25 is a cross sectional view of the body and the wedge member of the hook taken at line 12 of FIG. 11, along with a force distribution curve showing the base loaded pressure distribution.
Figure 26:
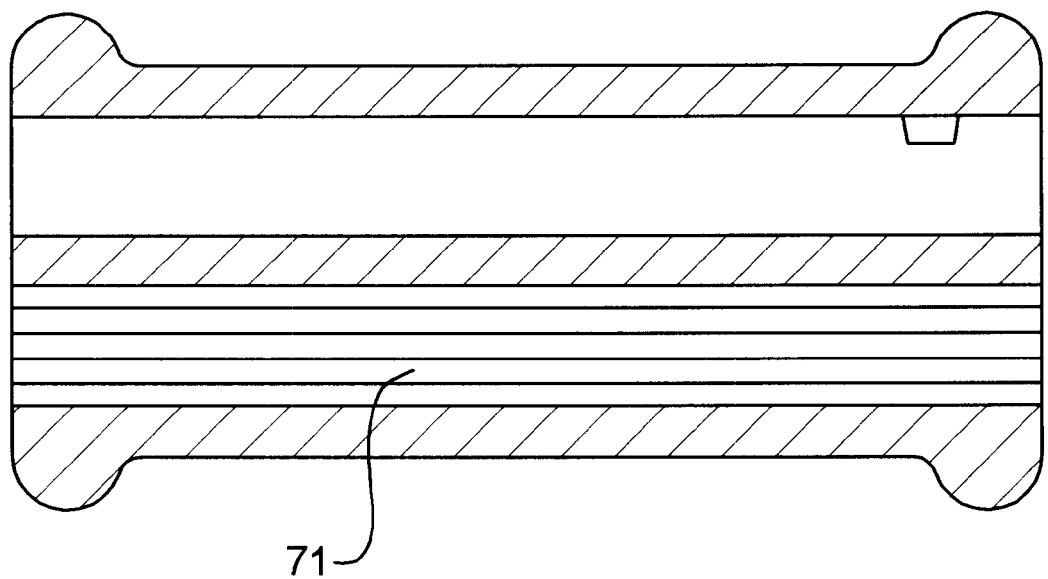
FIG. 26 is a sectional view taken showing the longitudinal grooves in the wedge surfaces.

Reference will now primarily be made to FIGS. 22–25. FIGS. 24 and 25 are taken from a perspective of line 12-24-25 in FIG. 11 except a wedge member 26 is superimposed therethrough. The angles are slightly exaggerated in FIGS. 22–25 for illustrative purposes to demonstrate the effect of varying angles.

The upper surface 70 of chamber 34 is angled with respects to the lower surface 76 of chamber 34 at an angle referred to as $\beta$ and the upper surface 92 is angled with respects to the lower surface 94 of the wedge member 26 and this angle is referred to as $\alpha$. As seen in FIGS. 22 and 23 the surfaces 70', 76', 94' and 92' are designated to represent and be parallel to the average plane of surfaces 70, 76, 94 and 92 respectfully. The relationship between $\alpha$ and $\beta$ determine an angle $\theta$ ($\alpha-\beta=\theta$) which is the angle between the lower surface 76 of chamber 34 and the upper surface 92 of the wedge member 26. As shown in FIG. 23 when surface 66' is in flush contact with surface 94'. Therefor, the angle of surface 60' with respects to surface 92' ($\theta$) is dependant upon both $\alpha$ and $\beta$. This is more easily seen in FIGS. 24 and 25 which are taken at a cross sectional view of line 12-24-25 in FIG. 11. You can see that $\theta$ becomes the angle between upper surface 70 and upper surface 92 of wedge 26. So, for example, if $\beta$ were to increase or $\alpha$ were to decrease this would decrease $\theta$ and would result in a base loaded pressure (see FIG. 24). Likewise if $\alpha$ was to increase and/or $\beta$ were to decrease then this would result in a front loaded pressure (see FIG. 25). The ramifications of front loaded and base loaded pressures are discussed further below.

Various angles of $\alpha$ and $\beta$ have been experimented with in order to produce the desirable characteristics of the hook 20 so that two main parameters are satisfied: 1) the cable in the chamber 24 will remain intact and not slip when tension is applied to the cable on the working end 37, and 2) when a sufficient force is applied to the front surface 102 the wedge and cable will slide out of the chamber 32 thereby increasing the distance 120 and the cable can be easily removed. The first parameter mentioned above is referred to as the "Holding Power" of the hook 20 which is defined as the tension required for the hook 20 to slip divided by the tension it takes to break the cable. So, for example, if it takes 3600 lbs. of tension for the cable slip from the hook when tension is applied to the working side of the cable, and 4000 lbs. of tension is required to break the cable; then the holding power of the hook 20 is 90% (3600 lbs./4000 lbs.).

As seen in FIG. 17, the distance 120 is defined as the distance from the top surface 92 of the wedge member 26 to the upper surface 70. As the wedge member 26 is inserted into the chamber 34 distance 120 decreases. If $\alpha$ and $\beta$ are the same angle, then the distance 120 is the same with respects to traveling along longitudinal axis of the body 22. Likewise, when the wedge member 26 is inserted into chamber 34 the distance 120 will uniformly decrease at any location along the longitudinal axis. Therefore, if a cable is inserted in the front end 28 of through the chamber 34, when the wedge member 26 is pounded at the base portion 90, the pressure on the cable is substantially uniform along the longitudinal axis.

Now referring to back to FIG. 24, if $\alpha$ is less than $\beta$ then the distance 120a is less in the front end portion 88 of the wedge 26 and distance 120b is greater in the base end portion 90 of the wedge 26. Therefore when a cable is inserted through the chamber 34 and the wedge 26 is pounded in at the base end portion 38, the front-end portion 88 of the wedge 26 will come in more forceful contact with the cable and the base end portion will come in less forceful contact with the cable. As the wedge 26 is pounded at the base end in further, the front-end portion 88 will continually be forced against the cable more than that of the rear end portion 90, thereby causing more pressure on the front-end portion of the cable. This is referred to as a front-end loaded pressure. As shown in the accompanying force pressure diagram in FIG. 24 the pressure is much greater in the front-end portion 88 of the wedge 26.

Likewise as shown in FIG. 25, $\alpha$ is greater than $\beta$, and hence 120d is now less than distance 120c so there is more pressure exerted in the base end portion 90 of the wedge 26. Hence the embodiment shown in FIG. 25 is referred to as a base end pressure distribution.

Another way to analyze the relationship of $\alpha$ and $\beta$, is the wedge 26, cable 18 and body 22 have inherent spring like characteristics, which is commonly referred to the modulus of elasticity or the stiffness of the material. The force upon the cable can be calculated based upon the deflection the materials must undergo. Because the deflection of the materials of the wedge 26, cable and body 22 are greater at the front-end portion 88 the force is likewise greater.

After numerous trials and experimentation the inventor has experimented with various angles of $\alpha$ and $\beta$ and has come up with the following results

|  | Functional | | Desirable | | Most Desirable | |
| --- | --- | --- | --- | --- | --- | --- |
|  | $\alpha$ | $\beta$ | $\alpha$ | $\beta$ | $\alpha$ | $\beta$ |
| Even Distribution of Pressure | 2.8°–5.4° | 2.8°–5.4° | 3.2°–4.6° | 3.2°–4.6° | 3.8°–4.2° | 3.8°–4.2° |
| Front End Loaded Pressure | 2.8°–3.7° | 3.5°–4.7° | 3.0°–3.6° | 3.6°–4.5° | 3.2°–3.6° | 3.8°–4.2° |
| Base End Loaded Pressure | 3.5°–4.7° | 2.8°–3.7° | 3.6°–4.5° | 3.0°–3.6° | 3.8°–4.2° | 3.2°–3.6° |

The inventor has found that angles of $\beta$ at 4.0° and $\alpha$ at 3.4° which produces a front end loaded pressure and gives the most desirable characteristic of holding the cable in place and removing it when the front end portion 36 is struck with a hammer. At these values of α and β the holding power of the hook 20 is 100% or in other words, the cable will break before the cable slips from the hook 20. This is desirable when a crane operator desires to have immediate access to a log bundle and wants to break the cable circumferentially holding the logs together. The hook 20 will remain in tact and hold the cable loop together until the cable snaps. The hook has been effective on 9 mm 7 strand galvanized and ⅜" diameter. Of coarse the dimensions of the hook can be altered to accommodate an assortment of cables. Further, the Figures show the cable as a right handed lay; of course the groves A second desirable angle configuration is the inverse of the former where α is at 4.0° and β is at 3.4°. This produces a base load distribution that has similar desirable characteristics of holding the cable and ease of removing the cable. The inventor has further achieved a functional hook 20 utilizing an even pressure distribution where α is at 4.0° and β is at 4.0° and a configuration α is at 3.0° and β is at 3.0°. The even pressure distributions tend to give a holding power less than 100%. This is useful in situations where the cables in the hook 20 should slip before the cables break. This can be a desirable safety feature because the slipping action will not immediately drop the load on the cables and it is an indication that the maximum threshold of the cable and hook 20 is reached before catastrophic failure.

When α and β are at lower angles the vertical displacement of the wedge 26 with respect to the body 22 is less. Therefor the wedge 26 will be inserted deeper into the chamber 46 to achieve the necessary pressure to hold the cable therein. The lower angles of α and β will lock the cable in better; however, removal of the cable is much more difficult because as the wedge 26 is incrementally moved out of the chamber 34, the distance 120 increases less per unit of longitudinal travel of the wedge 26. In other words the pressure on the cable changes less per unit of longitudinal travel of the wedge member 26 with respects to the body 22. Lower angles of α and β for the hook 20 are better when the body 22 and wedge members 24 are made from stiffer materials (higher Modulus of Elasticity) and when the cable in use is made from a stiffer, less compressible material.

For higher angles of α and β such as 4°–5°, the pressure upon the cable changes greater with less longitudinal travel of the wedge member 26 with respects to the body 22. Greater angles of α and β are better suited when the body 22 and wedge 26 are made from softer materials or used on a softer cable (lower Modulus of Elasticity).

The foregoing is a description of the preferred embodiment and of course other similar embodiments could be employed without departing from the spirit of the invention. The geometry of the chambers 32 and 34 are such that if the body 22 where cut in the longitudinal-vertical plane 46 in the transverse center of the body 22 to create two sections. Each chamber of each section is identical if you rotate a section one hundred and eighty degrees about the transverse axis and one hundred and eighty degrees about the longitudinal axis. This however, is only the preferred embodiment, chamber 32 could only be rotated one hundred and eighty degrees about the vertical axis to equal chamber 34. However, the working ends of the cable will not be at opposite corners in the transverse-vertical plane. The crucial aspect of the design is that the working ends 29 and 31 are on longitudinally opposite sides of the body 22.

The oblique grooves 122 and the longitudinal grooves 68 are located on the surface 92 of the wedge member 24 and lower surface 66 of the chambers 32 respectively. This is only one embodiment, either surface 92 or 66 could be oblique or longitudinal. The applicant has found that having one surface oblique and an opposing surface longitudinal has desirable effects of increasing the holding power and not allowing the cable to rotate out of the chamber.

As previously mentioned, the purpose of the longitudinal grooves is to prevent the cables from rotating out of the chambers. Of course the grooves 68 don't have to be longitudinal. The important aspect is that the grooves 68 have an edge 73 (FIG. 9) that will dig into the cable 18 in order to prevent rotation of the cable 18. Therefore surfaces such as gnarled surfaces would work, or if the lower surface 66 is made from a softer material where the cable partially impresses itself thereon and the coefficient of friction is sufficient to hold the cable inside. The cable engaging surfaces 122 for the wedges are adapted for a righthand lay, of course the cable engaging surfaces 122 could be adapted for a left hand lay where the oblique grooves will be a mirror image of the present cable engaging surfaces 122. The inventor has found that having a length of the body in the longitudinal direction between three to five inches works well for engaging the cable.

While the invention is susceptible of various modifications and alternative forms, specific embodiments thereof have been shown by way of example in the drawings and will herein be described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A connector for cables where said connector has a longitudinal axis, said connector comprising:
   a) a body having a first inner surface defining a first chamber having a working end, said first inner surface comprising a first chamber contact surface and a second chamber contact surface;
   b) a first wedge having a forward end and a base end, said first wedge having a first wedge contact surface and a second wedge contact surface, said first wedge being adapted to be received by said first chamber where said first wedge contact surface of said first wedge is adapted to slide on said first contact surface of said first chamber;
   c) said second chamber contact surface of said first chamber and said second wedge contact surface of said first wedge each defining grooves that are adapted to hold a cable therein;
   d) said body further comprising a second inner surface defining a second chamber having a working end, said second inner surface comprising a first chamber contact surface and a second chamber contact surface;
   e) a second wedge having a forward end and a base end, said second wedge further having a first wedge contact surface and a second wedge contact surface, said second wedge adapted to be received by said second chamber where said first wedge contact surface of said second wedge is adapted to slide on said first chamber contact surface of said second chamber;
   f) said second chamber contact surface of said second chamber and said second wedge contact surface of said second wedge each defining grooves that are adapted to hold a cable therein;
   g) said grooves on one of said second wedge contact surface of said first wedge and said second chamber contact surface of said first chamber being substantially oblique and adapted to engage the threads of a cable and the grooves of the other of said second wedge contact surface of said first wedge and said second chamber contact surface of said first chamber are substantially longitudinal and adapted to engage a cable.

2. The connector as recited in claim 1, wherein the grooves of the second wedge contact surface of the first wedge are substantially oblique, and the grooves of the second chamber contact surface of said first chamber are substantially longitudinal.

3. The connector as recited in claim 1, wherein the grooves of the second wedge contact surface of the first wedge are substantially longitudinal, and the grooves of the second chamber contact surface of said first chamber are substantially oblique.

4. A reusable connector assembly adapted for connecting and disconnecting first and second cable portions, said connector assembly comprising:
   a) a unitary body with a longitudinal axis and having;
      i) a first inner surface portion defining a first chamber having a first working end and a first dog end, a stationary first cable contact surface and a stationary first wedge contact surface which slant toward one another in a direction from the first dog end to the first working end, and
      ii) a second inner surface portion defining a second chamber having a second working end and a second dog end, the second inner surface further defining a second stationary cable contact surface and a second stationary wedge contact surface which slant toward one another in a direction from the said second dog end to the second working end;
   b) a first wedge having;
      a first forward end and a first base end, said first wedge having a first cable engaging surface and a first body engaging surface which converge toward one another in a direction from the first base end toward the first forward end, said first wedge to be positioned in the first chamber with the first forward end being closer to the working end of the first chamber than the first base end, said first wedge being arranged to be movable between a rear release position and a forward retaining position;
   c) a second wedge having;
      a second forward end and a second base end, said second wedge having a second cable engaging surface and a second body engaging surface which converge toward one another in a direction from the second base end toward the second forward end, said second wedge to be positioned in the second chamber with the second forward end being closer to the working end of the second chamber than the second dog end, said second wedge being arranged to be movable between a rear release position and a forward retaining position;
   d) the first chamber being arranged to receive the first cable portion that can be inserted through the first chamber between the first cable contact surface of the body and the first cable engaging surface of the first wedge and the first cable portion secured therein by moving the first wedge from the release position to the retaining position with said first body engaging surface of the first wedge sliding over said first wedge contact surface of the body, and the first cable engaging surface of the first wedge moving relative to the stationary first cable engaging surface of the body to press the first cable portion into direct contact with the first cable contact surface of the body;
   e) the said second chamber being arranged to receive the second cable portion that can be inserted through the second chamber between the second cable contact surface of the body and the second cable engaging surface of the second wedge and the second cable portion secured therein by moving the second wedge from the release position to the retaining position with said second body engaging surface sliding over said second wedge contact surface, and the second cable engaging surface moving relative to the stationary second cable engaging surface of the body to press the second cable portion into direct contact with the second cable contact surface of the body, whereby each of the first and second wedges is able to retain its first and second cable portions, respectively, independently of the other wedge so that one cable portion can be first secured in the connector assembly, and at a later time the other cable portion can be secured to the connector assembly.

5. The connector assembly as recited in claim 1, wherein the cable contact surface and the wedge contact surface of at least one of the first and second chambers form an angle between 2.5° degrees to 5.5° degrees.

6. The connector assembly as recited in claim 5, wherein at least one of said cable contact surfaces and a related one of said wedge contact surfaces has one of said first and second wedges positioned therein, said one of said first and second wedges having its cable engaging surface and its body engaging surface forming an angle of between 2.5° degrees to 5.5° degrees.

7. The connector assembly as recited in claim 4, wherein each of the first cable contact surface and the first wedge contact surface, each of the second cable contact surface and the second wedge contact surface, each of the first cable engaging surface and the first body engaging surface, and each of the second cable engaging surface and the second body engaging surface form a surface pair which form an angle between 2.5° degrees to 5.5° degrees.

8. The connector assembly as recited in claim 4, wherein at least one of the first wedge, along with its related first chamber, and the second wedge, along with its second chamber, has a slot/protrusion locking arrangement where there is an elongate slot formed in either the wedge or a wall of its related chamber and a protrusion formed at the other of the wedge and the wall of its related chamber, with the protrusion having a limited forward to rear path of travel in the slot, and with the related wedge being retained to have limited lateral movement in the chamber so that the protrusion remains positioned in the slot, whereby the wedge has limited free movement in its related slot between the release position and the retaining position to retain the wedge at least partly in its related chamber, regardless of positioning of the other wedge in the other chamber.

9. The connector assembly as recited in claim 8, wherein said slot is aligned with the wedge contact surface of the wedge that has the slot/protrusion locking arrangement whereby the wedge moves forwardly and rearwardly in a direction generally parallel to the related wedge contact surface while the protrusion is located in the slot.

10. The connector assembly as recited in claim 4, wherein the body has additionally vertical and transverse axes, and the first cable contact surface is spaced vertically from the first wedge contact surface, and the second cable contact surface is spaced vertically from the second wedge contact surface, and each of the first and second chambers has an outer and inner generally planar wall surface substantially aligned in a plane generally parallel with a plane defined by the longitudinal and vertical axes, and each of the first and second wedges has its cable engaging surface and its body engaging surface spaced vertically from one another, and each of the first and second wedges has side surfaces which are substantially planer and occupy a plane generally parallel to a plane defined by the longitudinal and vertical axis, with the inner and outer side surfaces of the wedges being closely adjacent to the inner and outer surfaces of its related chamber, whereby each of the wedges is able to have a vertical component of travel in moving between its release and retaining positions.

11. The connector assembly as recited in claim 4, wherein the first and second chambers are located substantially in side-by-side relationship, and separated by a center wall structure which at least partially separates said first and second chambers, and with said first and second chambers being located at generally the same location relative to the vertical and longitudinal axis.

12. The connector assembly as recited in claim 4, wherein said first and second wedges and said first and second chambers are arranged so that with each of the first and second wedges in its retaining position, forward and rear end portions of the first and second wedges extend beyond adjacent end surfaces of the body, whereby either the front end portion or rear end portion of the first and second wedges can be impacted to cause the movement thereof.

13. The connector assembly as recited in claim 4, wherein the body has at forward and rear outer edge portions thereof a flange portion to facilitate gripping of the body in a person's hand.

14. The apparatus as recited in claim 4, wherein the first and second working ends of the chambers are positioned at opposite end portions of the body.

15. A method of securing a cable having first and second end portions around a group of objects, such as logs, to make a bundle of said objects, said method comprising:
  a) providing a connector assembly adapted for connecting first and second end cable portions by;
    i) providing a unitary body with a longitudinal axis and having a first inner surface portion defining a first chamber having a first working end and a first dog end, a stationary first cable contact surface and a stationary first wedge contact surface which slant toward one another in a direction from the first dog end to the first working end, and a second inner surface defining a second chamber having a second working end and a second dog end, the second inner surface further defining a stationary second cable contact surface and a stationary second wedge contact surface which slant toward one another in a direction from the said second dog end to the second working end,
    ii) providing a first wedge having a first forward end and a first base end, said first wedge having a first cable engaging surface and a first body engaging surface which converge toward one another in a direction from the first base end toward the first forward end, and positioning said first wedge in said first chamber with the first forward end of the first wedge being positioned closer to the first working end of the first chamber than the first base end of the first wedge;
    iii) providing a second wedge having a second forward end and a second base end, said second wedge having a second cable engaging surface and a second body engaging surface which converge toward one another in a direction from the second base end toward the second forward end, and positioning said second wedge in said second chamber with the second forward end being positioned closer to the second working end of the second chamber than the second base end;
  b) inserting the first end portion of the cable through the first working end of the first chamber between the first cable contact surface of the body and the first cable engaging surface of the first wedge;
  c) moving the first wedge with the first front end moving towards the first working end so that said first body engaging surface of the first wedge slides over said first wedge contact surface of the body, and the cable engaging surface of the first wedge presses against the first end portion of the cable into direct contact with the cable contact surface of the first chamber to secure the first portion of the cable in the connector assembly;
  d) moving at least one end portion of the cable around the group of objects so that the cable surrounds the group of objects;
  e) inserting the second end portion of the cable through the second working end of the second chamber between the second cable contact surface of the body and the second cable engaging surface of the second wedge;
  f) moving the second wedge with the front end moving towards the said second working end so that said second body engaging surface of the second wedge slides over said second wedge contact surface of the body, and the cable engaging surface of the second wedge presses against the second end portion of the cable to secure the second end portion of the cable in the connector assembly whereby the cable is secured in its position surrounding the group of objects.

16. The method as recited in claim 15, wherein each of the first wedge, along with its related first chamber, and the second wedge, along with its second chamber, has a slot/protrusion locking arrangement where there is an elongate slot formed in either the wedge or a wall of its related chamber and a protrusion formed at the other of the wedge and the wall of its related chamber, with each protrusion having a limited forward to rear travel in the slot, and with the related wedge being retained to have limited lateral movement in the chamber so that the protrusion remains positioned in the slot, whereby each wedge has limited free movement in its related slot between the release position and the retaining position to retain the wedge at least partly in its related chamber, regardless of positioning of the other wedge in the other chamber.

17. The method as recited in claim 16, wherein the group of objects is a group of logs, and the first end portion of the cable connected to the body is moved at least partly around the group of logs in bringing the cable around the logs.

18. The method as recited in claim 16, wherein each slot is aligned with the related wedge contact surface that has the slot/protrusion locking arrangement, and moving the wedge in a direction parallel to the related wedge contact surface.

19. The method as recited in claim 15, wherein the body has additionally vertical and transverse axes, and the first cable contact surface is spaced vertically from the first wedge contact surface, and the second cable contact surface is spaced vertically from the second wedge contact surface, and each of the first and second chambers has an outer and inner wall surface substantially aligned in a related plane generally parallel with a plane defined by the longitudinal and vertical axis, and each of the first and second wedges has its cable engaging surface and its body engaging surface spaced vertically from one another, and each of the first and second wedges has side surfaces which are substantially planer and occupy a plane generally parallel to a plane defined by the longitudinal and vertical axis, with the inner and outer side surfaces of the wedges being closely adjacent to the inner and outer surfaces of its related chamber, said method further comprising moving each of the wedges with a vertical component of travel in moving between its release and retaining positions.

20. The method as recited in claim 15, wherein the first and second chambers are located substantially in side-by-side relationship, and separated by a center wall structure which at least partially separates said first and second chambers, and with said first and second chambers being located at generally the same location relative to the vertical and longitudinal axis.

21. The method as recited in claim 15, wherein said first and second wedges and said first and second chambers are arranged so that with each of the first and second wedges in its retaining position, forward and rear end portions of the first and second wedges extend beyond adjacent end surfaces of the body, said method further comprising impacting the front end portion or rear end portion of the first and second wedges to cause the movement thereof.

22. A connector assembly adapted for connecting first and second cable portions, said connector assembly comprising:
   a) a unitary body with a longitudinal axis, a transverse axis and a vertical axis, and having;
      i) a first inner surface portion defining a first chamber having a first working end and a first dog end, a first cable contact surface and a first wedge contact surface which are vertically spaced from one another relative to said vertical axis and which slant toward one another in a direction from the first dog end to the first working end, said body having at least a first wall portion having a first wall lateral surface portion comprising at least a part of said first inner surface portion and located between said first cable contact surface and said first wedge contact surface; and
      ii) a second inner surface portion defining a second chamber having a second working end and a second dog end, the second inner surface further defining a second cable contact surface and a second wedge contact surface which are vertically spaced from one another relative to said vertical axis and, which slant toward one another in a direction from the said second dog end to the second working end, said body having at least a second wall portion having a second wall lateral surface portion comprising at least a part of said second inner surface portion, and located between said second cable contact surface and said second wedge contact surface;
   b) a first wedge having;
      a first forward end and a first base end, said first wedge having a first cable engaging surface and a first body engaging surface which converge toward one another in a direction from the first base end toward the first forward end, said first wedge being positioned in the first chamber with the first forward end being closer to the working end of the first chamber than the first base end, said first wedge having a first lateral wedge surface portion which is located between said first cable engaging surface and said first body engaging surface of the first wedge, and which is facing toward and adjacent to said first wall surface portion of the first inner wall surface portion, said first wedge being arranged to be moveable between a rear release position and a forward retaining position;
   c) a second wedge having;
      a second forward end and a second base end, said second wedge having a second cable engaging surface and a second body engaging surface which converge toward one another in a direction from the second base end toward the second forward end, said second wedge being adapted to be positioned in the second chamber with the second forward end being closer to the working end of the second chamber than the second dog end, said second wedge having a second lateral wedge surface portion which is located between said second cable engaging surface and said second body engaging surface of the second wedge, and which is facing toward and adjacent to said second wall surface portion of the second inner wall surface portion, said second wedge being arranged to be moveable between a rear release position and a forward retaining position;
   d) the first chamber being arranged to receive the first cable portion that can be inserted through the first chamber between the first cable contact surface of the body and the first cable engaging surface of the first wedge and the first cable portion secured therein by moving the first wedge from the release position to the retaining position with said first body engaging surface of the first wedge sliding over said first wedge contact surface of the body, and the first cable engaging surface of the first wedge moving relative to the stationary first cable engaging surface of the body to press against the first cable portion into direct contact with the first cable contact surface of the body;
   e) said second chamber being arranged to receive the second cable portion that can be inserted through the second chamber between the second cable contact surface of the body and the second cable engaging surface of the second wedge and the second cable portion secured therein by moving the second wedge from the release position to the retaining position with said second body engaging surface sliding over said second wedge contact surface, and the second cable engaging surface moving relative to the stationary second cable engaging surface of the body to press the second cable portion into direct contact with the second cable contact surface of the body;
   f) whereby each of the first and second wedges are able to retain its first and second cable portions, respectively, independently of the other wedge so that one cable portion can be first secured in the connector assembly, and at a later time the other cable portion can be secured to the connector assembly;
   g) said first chamber and said first wedge having a first slot/protrusion movement limiting arrangement, with a substantially longitudinally aligned or nearly longitudinally aligned slot being formed at one of said first wall lateral surface portion and said first lateral wedge surface portion, and a first protrusion positioned in said first slot for limited forward and rear movement between release and retaining positions and being formed at the other of said first wall lateral surface portion and said first lateral wedge surface portion;
   h) said second chamber and said second wedge having a second slot/protrusion movement limiting arrangement with a substantially longitudinally aligned or nearly substantially aligned slot being formed at one of said second wall lateral surface portions and said second lateral wedge surface portion, and a second protrusion positioned in said second slot for limited forward and rear movement between release and retaining positions and being formed at the other of said second wall lateral surface portion and said second lateral wedge surface portion;

i) each of said first and second chambers being arranged relative to the first and second wedges so that lateral movement having a component of travel in a direction of transverse axis is limited to maintain each of said first and second wedges positioned to maintain the first and second protrusions in their respective slots regardless of the location of the other wedge, so that each of the wedges is always at least partly retained by said body.

23. The connector assembly as recited in claim 22 wherein each of the first cable contact surface of the first wedge contact surface, each of the second cable contact surface and the second wedge contact surface, each of the first cable engaging surface and the first body engaging surface, and each of the second cable engaging surface and the second body engaging surface form a surface pair which form an angle between 2.5° degrees to 5.5° degrees.

24. The connector assembly as recited in claim 22, wherein the first cable contact surface is spaced vertically from the first wedge contact surface, and the second cable contact surface is spaced vertically from the second wedge contact surface, and each of the first and second chambers has outer and inner generally planer wall surface substantially aligned in a plane generally parallel with a plane defined by the longitudinal and vertical axes, and each of the first and second wedges has its cable engaging surface and its body engaging surface spaced vertically from one another, and each of the first and second wedges has side surfaces which are substantially planer and occupy a plane substantially parallel to a plane defined by the longitudinal and vertical axes, with the inner and outer side surfaces of the wedges being closely adjacent to the inner and outer surfaces of its related chamber, whereby each of the wedges is able to have a vertical component of travel in moving between its release and retaining positions.

25. The connector assembly as recited in claim 22, wherein the first and second chambers are located substantially in side-by-side relationship, and separated by a center wall structure which at least partially separates said first and second chambers, and with said first and second chambers being located at generally the same location relative to the vertical and longitudinal axis.

26. The connector assembly as recited in claim 22, wherein said first and second wedges and said first and second chambers are arranged so that with each of the first and second wedges in its retaining position, forward and rear end portions of the first and second wedges extend beyond adjacent end surfaces of the body, whereby either the front end portion or rear end portion of the first and second wedges can be impacted to cause the movement thereof.

27. The connector assembly as recited in claim 22, wherein the body has at forward and rear outer edge portions thereof a flange portion to facilitate gripping of the body in a person's hand.

28. The connector assembly as recited in claim 22, wherein the first and second working ends of the chambers are positioned at opposite end portions of the body.

29. A connector assembly adapted for connecting first and second cable portions, said connector assembly comprising:
a) a unitary body with a longitudinal axis, a transverse axis and a vertical axis, and having;
  i) a first inner surface portion defining a first chamber having a first working end and a first dog end, a first cable contact surface and a first wedge contact surface which are vertically spaced from one another relative to said vertical axis and which slant toward one another in a direction from the first dog end to the first working end; and
  ii) a second inner surface portion defining a second chamber having a second working end and a second dog end, the second inner surface further defining a second cable contact surface and a second wedge contact surface which are vertically spaced from one another relative to said vertical axis and, which slant toward one another in a direction from the said second dog end to the second working end;
b) a first wedge having;
  a first forward end and a first base end, said first wedge having a first cable engaging surface and a first body engaging surface which converge toward one another in a direction from the first base end toward the first forward end, said first wedge being positioned in the first chamber with the first forward end being closer to the working end of the first chamber than the first base end, said first wedge being arranged to be moveable between a rear release position and a forward retaining position with the first wedge contact surface being in sliding engagement with the first body engaging surface;
c) a second wedge having;
  a second forward end and a second base end, said second wedge having a second cable engaging surface and a second body engaging surface which converge toward one another in a direction from the second base end toward the second forward end, said second wedge being adapted to be positioned in the second chamber with the second forward end being closer to the working end of the second chamber than the second dog end, said second wedge being arranged to be moveable between a rear release position and a forward retaining position, with the second wedge contact surface being in sliding engagement with the second body engaging surface;
d) the first chamber being arranged to receive the first cable portion that can be inserted through the first chamber between the first cable contact surface of the body and the first cable engaging surface of the first wedge and the first cable portion secured therein by moving the first wedge from the release position to the retaining position with said first body engaging surface of the first wedge sliding over said first wedge contact surface of the body, and the first cable engaging surface of the first wedge moving relative to the stationary first cable engaging surface of the body to press against the first cable portion into direct contact with the first cable contact surface of the body;
e) said second chamber being arranged to receive the second cable portion that can be inserted through the second chamber between the second cable contact surface of the body and the second cable engaging surface of the second wedge and the second cable portion secured therein by moving the second wedge from the release position to the retaining position with said second body engaging surface sliding over said second wedge contact surface, and the second cable engaging surface moving relative to the stationary second cable engaging surface of the body to press the second cable portion into direct contact with the second cable contact surface of the body;

f) said first wedge having first and second generally vertically aligned wedge side surface portions that are adjacent to first and second generally vertically aligned chamber side surface portions of the first chamber, in a manner to retain the first wedge positioned in vertical and longitudinal alignment with the first chamber and limit transverse movement of the first wedge between the release and retaining positions;

g) said second wedge having first and second generally vertically aligned wedge side surface portions that are adjacent to first and second generally vertically aligned chamber side surface portions of the second chamber, in a manner to retain the second wedge positioned in vertical and longitudinal alignment with the second chamber and limit transverse movement of the second wedge between the release and retaining positions;

whereby each of the first and second wedges are able to retain its first and second cable portions, respectively, independently of the other wedge so that one cable portion can be first secured in the connector assembly, and at a later time the other cable portion can be secured to the connector assembly;

h) said first chamber and said first wedge having a first slot/protrusion locking arrangement, with a first slot being formed at one of said wedge side surface portions and an adjacent one of said chamber side surface portions of the first chamber, and a first protrusion positioned in said first slot for limited forward and rear movement between release and retaining positions and being formed at the other of said chamber side surface portion and said first wedge side surface portions, said first slot being parallel to the first wedge contact surface and the first body engaging surface:

i) said second chamber and said second wedge having a first slot/protrusion locking arrangement, with a first slot being formed at one of wedge side surface portions and an adjacent one of said chamber side surface portions of the second chamber, and a second protrusion positioned in said second slot for limited forward and rear movement between release and retaining positions and being formed at the other of said chamber side surface portion and said second wedge side surface portions, said second slot being parallel to the second wedge contact surface and the second body engaging surface;

j) said assembly being arranged so that movement of the first and second wedges is limited so that each of the wedges is always at least partly retained by said body.

* * * * *